(12) United States Patent
Motonishi

(10) Patent No.: US 7,545,606 B2
(45) Date of Patent: Jun. 9, 2009

(54) HEAD ELEMENT SUPPORT APPARATUS WITH ELASTIC MATERIAL

(75) Inventor: Michiharu Motonishi, Niigata-ken (JP)

(73) Assignee: TDK Corporation, Tokyo (JP)

( * ) Notice: Subject to any disclaimer, the term of this patent is extended or adjusted under 35 U.S.C. 154(b) by 492 days.

(21) Appl. No.: 11/369,637

(22) Filed: Mar. 7, 2006

(65) Prior Publication Data

US 2006/0203391 A1  Sep. 14, 2006

(30) Foreign Application Priority Data

Mar. 11, 2005 (JP) ............................. 2005-068942

(51) Int. Cl.
*G11B 5/48* (2006.01)
(52) U.S. Cl. ............... 360/244.3; 360/244.8; 360/244.9
(58) Field of Classification Search .... 360/244.2–245.7
See application file for complete search history.

(56) References Cited

U.S. PATENT DOCUMENTS

| | | | | |
|---|---|---|---|---|
| 5,835,307 | A * | 11/1998 | Sone ....................... | 360/244.9 |
| 6,063,508 | A * | 5/2000 | Hanrahan et al. ........... | 428/596 |
| 6,369,986 | B1 * | 4/2002 | Coon ....................... | 360/244.9 |
| 6,392,843 | B1 * | 5/2002 | Murphy .................... | 360/245.3 |
| 7,068,469 | B2 * | 6/2006 | Kuwajima et al. ........ | 360/244.5 |
| 2003/0161074 | A1 | 8/2003 | Horie et al. | |
| 2003/0193752 | A1 * | 10/2003 | Takahashi et al. ........ | 360/245.3 |
| 2004/0057159 | A1 * | 3/2004 | Kuwajima et al. ....... | 360/244.2 |
| 2004/0090711 | A1 * | 5/2004 | Kuwajima et al. ........ | 360/244.8 |
| 2004/0130825 | A1 * | 7/2004 | Danielson et al. ........ | 360/244.8 |
| 2004/0184193 | A1 * | 9/2004 | Honda et al. .............. | 360/244.2 |
| 2004/0207958 | A1 * | 10/2004 | Hashi et al. .............. | 360/244.2 |
| 2005/0128644 | A1 * | 6/2005 | Wada et al. .............. | 360/244.2 |

FOREIGN PATENT DOCUMENTS

| | | |
|---|---|---|
| JP | 48-103017 | 12/1973 |
| JP | 59-112469 | 6/1984 |
| JP | 63-298878 | 12/1988 |

OTHER PUBLICATIONS

English translation of the Office Action issued in corresponding Chinese Patent Application No. 200610054749.X from Chinese Patent Office, submitted Jun. 27, 2008.

* cited by examiner

*Primary Examiner*—William J Klimowicz
(74) *Attorney, Agent, or Firm*—Brinks Hofer Gilson & Lione

(57) ABSTRACT

A head element support apparatus having a load beam including a first elastic member, a second elastic member. The elastic members are fixedly joined together at a joining portion. The first elastic member has a first elastically deformable portion, the second elastic member has a second elastically deformable portion, and the bending rigidity of the first elastically deformable portion is lower than the bending rigidity of the second elastically deformable portion. The second elastically deformable portion is deformable about an intermediate pivot. The balance between a floating force and a load pressure, acting on a slider, may be maintained, and consequently, and the slider may move in a rolling direction and a pitching direction.

6 Claims, 3 Drawing Sheets

HEAD ELEMENT SUPPORT APPARATUS WITH ELASTIC MATERIAL

This application claims the benefit of Japanese patent application No.: 2005-068942, filed on Mar. 11, 2005, which is incorporated herein by reference.

TECHNICAL FIELD

The present application relates to a head element support apparatus that supports a head element facing a magnetic recording medium, such as a hard disk.

BACKGROUND

FIG. 4 is a plan view showing a general structure of a conventional head element support apparatus, FIG. 5 is a side view of the conventional head element support apparatus, and FIG. 6 shows the principle of support of the conventional head element support apparatus.

The head element support apparatus 1 shown in FIGS. 4 and 5 has a head element 2, gimbals 3 having the head element 2 fixed thereto, and a load beam 4 that supports the gimbals 3 at its tip. The head element 2 has a slider 5 formed of a ceramic material. A magnetic recording unit and a magnetic reproducing unit are mounted on a trailing end surface 5a of the slider 5. The gimbals 3 are formed of an extremely thin leaf spring material. A back surface of the slider 5 is fixedly adhered to the gimbals 3.

The load beam 4 is formed of an elastic plate having a sufficiently larger thickness and a higher rigidity than the gimbals 3. A base of the load beam 4 is a mounting portion 6 to which is fixed to a support 6a that is substantially a rigid body. A portion ahead of the mounting portion 6 is an elastically deformable portion 8. A portion ahead of the elastically deformable portion is a rigid portion 7 that is substantially a rigid body formed by bending both side edges of an elastic plate. As shown in FIG. 4, a central hole 8a is formed in the elastically deformable portion 8 to reduce bending rigidity. A tip of the load beam 4 is integrally formed with a pivot 9 serving as a supporting point. A substantially central portion of a back surface of the slider 5 fixed to the gimbals 3 is supported by the pivot 9.

In the head element support apparatus 1, the head element 2 provided at its tip faces a recording surface of a magnetic recording medium, such as a hard disk. As shown in the principle view of support of FIG. 6, in the head element support apparatus 1, a load pressure F is set depending on a bending elastic force of the elastically deformable portion 8. The load pressure F presses the slider 5 of the head element 2 against the recording medium. Also, the head element 2 is adapted to be swingable about an abutting point between the head element and the pivot 9, as a supporting point, in a rolling direction that is a direction of rotation about a longitudinal centerline Ox and in a pitching direction that is a direction of rotation about a transverse centerline Oy, both directions are shown Ox shown in FIG. 4.

When a magnetic recording medium rotates, airflow above a surface thereof causes a floating force to act on the slider 5. In this case, a floating distance of the slider 5 from the magnetic recording medium is set depending on the load pressure F. Also, as the head element 2 swings in the rolling direction and the pitching direction, the slider 5 can follow up a vertical fluctuation or an inclination fluctuation of the surface of a magnetic recording medium.

JP-UM-A-48-103017 discloses an apparatus in which an auxiliary spring is joined to an intermediate portion of a supporting spring that is a load beam and the supporting spring is pressed by a leading end of an adjusting screw screwed on the auxiliary spring. In this apparatus, it is intended to adjust a pressing force to the supporting spring by the adjusting spring so as to adjust the load pressure acting on the slider.

As described in JP-A-59-112469, an additional auxiliary pressing member is provided on a load beam having a slider at its tip, and the pressing member is formed of a so-called shape-memory alloy that changes in its deformation state depending on temperature. When the apparatus is operated, a rise in temperature within the apparatus causes the shape-memory alloy to exhibit its restoring force, and the restoring force increases a load pressure. On the other hand, when the apparatus is stopped, a fall in temperature reduces a load caused by the shape-memory alloy.

In the current hard disk devices, the recording density of data to the magnetic recording medium becomes extremely high, and accordingly, the dimension of the slider 5 is minimized. Moreover, the floating distance of the magnetic reproducing unit and the magnetic recording unit from the surface of the magnetic recording medium mounted on the slider 5 is also minimized.

As shown in FIG. 6, in the conventional head element support apparatus 1, the load pressure F to be applied to the slider 5 is substantially set by only the bending rigidity of the elastically deformable portion 8 of the load beam 4. However, with a structure in which the load pressure is set by only the bending rigidity of the elastically deformable portion 8 provided at the base of the load beam 4, it is difficult to maintain the balance between the floating force acting on the minute head element and the load pressure, and thus it is difficult to control a floating distance of the slider 5 with little variation.

Further, in the conventional head element support apparatus 1, the posture of the slider 5 is controlled by only the deformation of the gimbals 3 with the pivot 9 as a fulcrum. Therefore, there is a limit to making the slider 5 flexibly follow the recording surface of the magnetic recording medium. In particular, it is difficult to flexibly deform the slider 5 by a minute amount in the pitching direction. Since the slider 5 poorly follows up the recording surface in the pitching direction against fluctuations in height and inclination of the recording surface of the magnetic recording medium, it becomes difficult to control the floating distance of the magnetic recording unit and the magnetic reproducing unit with a high degree of accuracy.

In the head element support apparatus described in JP-UM-A-48-103017, although the adjusting screw that varies spring pressure is provided on the load beam, setting the load pressure using the elastically deformable portion of the one load beam remains unchanged. Similarly, even in the head element support apparatuses described in JP-A-63-29887 and JP-A-59-112469, setting the load pressure using the elastically deformable portion of the one load beam remains unchanged. As such, in the configurations in which the load pressure is set using only the elastically deformable portion of the one load beam, it is difficult to control the load pressure with respect to the slider, as mentioned earlier, and to flexibly set changes in posture in the slider.

SUMMARY

A head element support apparatus provided with a load beam is disclosed. The load beam has a head element provided with at least one of a magnetic recording unit or a magnetic reproducing unit, gimbals having the head element fixed thereto, and a supporting point for the head element fixed to the gimbals. The load beam is configured such that a first elastic member having a mounting portion for fixation at its base and a second elastic member having the supporting point at its tip are connected to each other. Each of the first elastic member and the second elastic member has an elastically deformable portion. The bending rigidity of the elastically deformable portion of the first elastic member is lower than the bending rigidity of the elastically deformable portion of the second elastic member.

In a first aspect, the load beam may include the first elastic member and the second elastic member, and the load pressure is set by the bending rigidity of the elastic members. The second elastic member located at the tip of the load beam may have a slightly higher bending rigidity than the first elastic member and is elastically deformable. Therefore, the balance between the floating force and the load pressure may be maintained for the head element, and consequently, the floating amount of the head element can be made stable with little variation.

Moreover, since the second elastic member is elastically deformable, the posture of the head element may be flexibly and easily controlled, and the head element follows a surface of a rotating magnetic recording medium according to any fluctuation in the surface not only in a vertical direction, but also in rolling and pitching directions.

An intermediate supporting point that supports the second elastic member is provided between the first elastic member and the second elastic member.

In a second aspect, a head element support apparatus with a load beam is provided. The load beam has a head element provided with at least one of a magnetic recording unit or a magnetic reproducing unit, gimbals having the head element fixed thereto, and a supporting point for the head element fixed to the gimbals. The load beam is configured such that a first elastic member having a mounting portion for fixation at its base and a second elastic member having the supporting point at its tip are connected to each other. Each of the first elastic member and the second elastic member has an elastically deformable portion. An intermediate supporting point that supports the second elastic member is provided between the first elastic member and the second elastic member.

Since the second elastic member is elastically deformable, not only the balance between the floating force and load pressure, acting on the head element, is easily maintained, but also the second elastic member may be deformed about the intermediate supporting point. Therefore, swing of the head element in the rolling direction and the pitching direction can be changed, and consequently, the head element can flexibly follow the surface of the rotating magnetic recording medium.

The supporting point and the intermediate supporting point are located on a centerline that divides the load beam into two in a widthwise direction.

In the first and second aspects, the bending rigidity of a joining portion between the first elastic member and the second elastic member may be higher than the bending rigidity of the elastically deformable portion of the first elastic member and the bending rigidity of the elastically deformable portion of the second elastic member.

If the joining portion may function substantially as a rigid body, excessive deformation or shaking of the entire load beam can be suppressed, and the head element can be easily restrained from being improperly shaken due to any extraneous vibration or disturbance.

DETAILED DESCRIPTION

Figure 1:
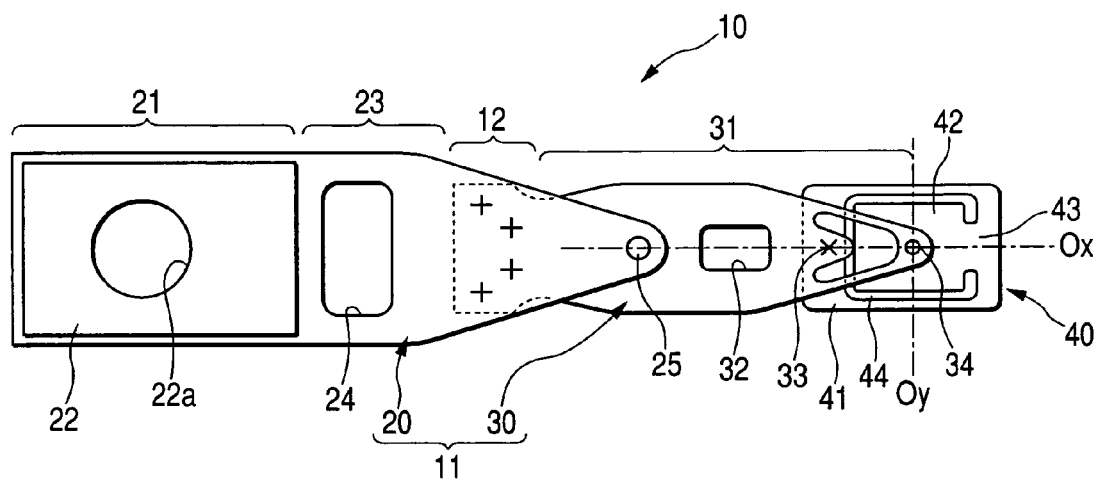
FIG. 1 is a plan view showing a head element support apparatus according to a first example.
Figure 2:
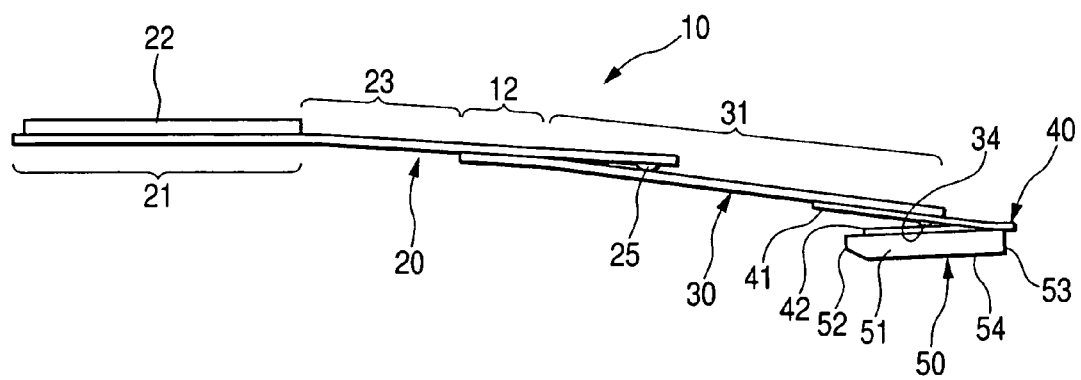
FIG. 2 is a side view of the head element support apparatus according to the first example.
Figure 3:
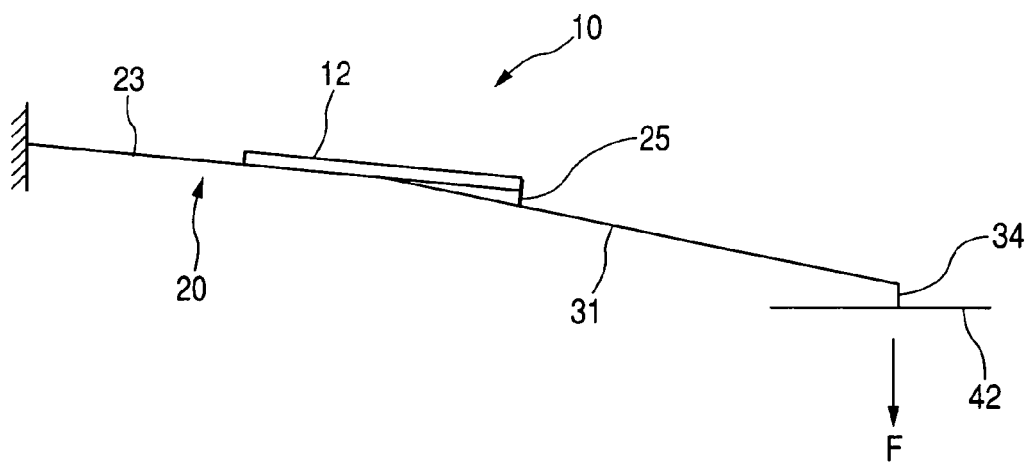
FIG. 3 shows the principle of support operation of the head element support apparatus according to the first example.
Figure 4:
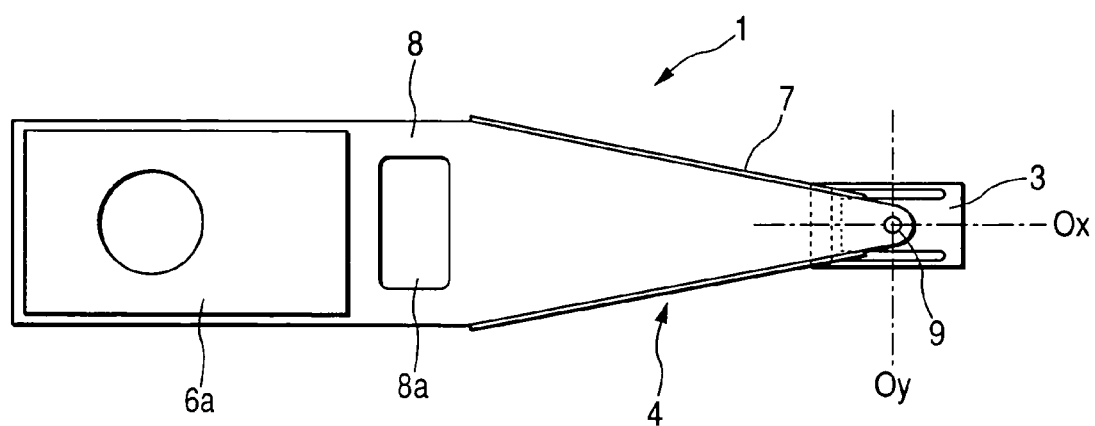
FIG. 4 is a plan view showing a head element support apparatus according to the related art.
Figure 5:
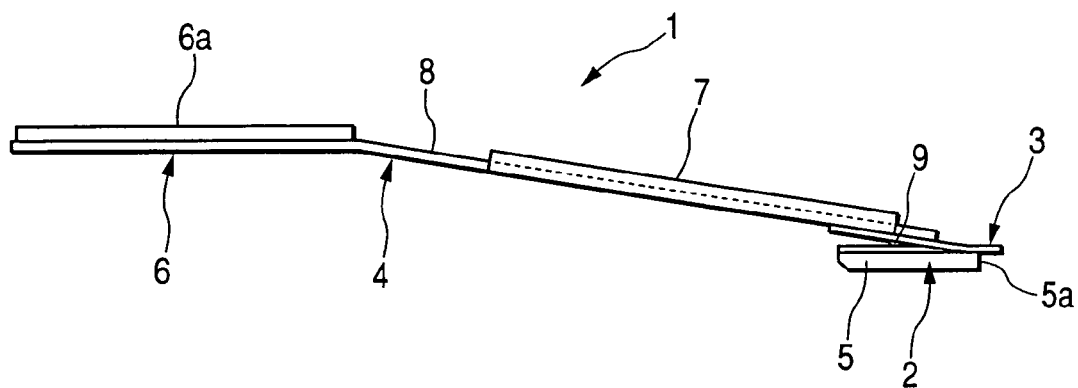
FIG. 5 is a side view of the head element support apparatus according to the related art.
Figure 6:
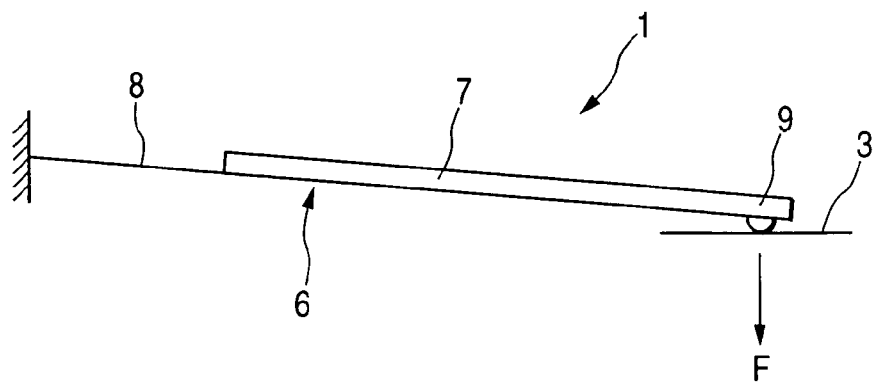
FIG. 6 shows the principle of support operation of the head element support apparatus according to the related art.

Exemplary embodiments may be better understood with reference to the drawings, but these examples are not intended to be of a limiting nature. Like numbered elements in the same or different drawings perform equivalent functions. FIG. 1 is a plan view showing a head element support apparatus according to a first embodiment of the invention, FIG. 2 is a side view of the head element support apparatus, and FIG. 3 shows the principle of support of the head element support apparatus.

The head element support apparatus 10 has a load beam 11. The load beam 11 is composed of a first elastic member 20 and a second elastic member 30. Both the first elastic member 20 and the second elastic member 30 are formed of an elastically-deformable metallic plate material. The first elastic member 20 and the second elastic member 30 are fixedly joined together in a joining portion 12. In the joining portion 12, the first elastic member 20 is superposed on the second elastic member 30, and they are joined together by spot welding or similar means, including the use of adhesive materials.

The first elastic member 20 has a mounting portion 21 at its base. A support 22 is superposed on the mounting portion 21 and fixed thereto. The mounting portion 21 is substantially a rigid body. A support hole 22a is formed in the mounting portion 21. The mounting portion 21 is attached to a scanning actuator mechanism within a hard disk device with the support hole 22a as a support reference.

A first elastically deformable portion 23 is formed between the mounting portion 21 and the joining portion 12 in the first elastic member 20. A rectangular hole 24 is formed in the first elastically deformable portion 23. This hole 24 allows the bending rigidity of the first elastically deformable portion 23 to be adjusted.

The bending rigidity of the joining portion 12 is higher than the bending rigidity of the first elastically deformable portion 23, and the joining portion 12 is formed as substantially a rigid body or similar. In a portion excluding the first elastically deformable portion 23 and ahead of the first elastically deformable portion, bent portions (not shown) may be formed at both side edges of the first elastic member 20 to further increase the rigidity of a region including the joining portion 12.

In the second elastic member 30, substantially the length of a portion excluding the joining portion 12, becomes a second elastically deformable portion 31. A tip of the first elastic member 20 is provided with an intermediate pivot 25 that protrudes downwardly from, and may be formed integrally with, the first elastic member 20. The intermediate pivot 25 abuts on the second elastically deformable portion 31, and a point of abutment between the intermediate pivot 25 and the second elastically deformable portion 31 functions as an intermediate supporting point. The second elastic member 30 is pushed downwardly by the intermediate pivot 25, and consequently, the second elastically deformable portion 31 is deformed so as to incline downwardly with a boundary between itself and the joining portion 12 as a support end.

A rectangular hole 32 is formed in the second elastically deformable portion 31. Forming this hole 32 allows the bending rigidity of the second elastically deformable portion 31 to be adjusted.

In the load beam 11, the bending rigidity of the first elastically deformable portion 23 when it is bent in a direction along a longitudinal centerline Ox is made lower than the bending rigidity of the second elastically deformable portion 31 in this direction. In other words, the bending rigidities satisfy the following inequality: first elastically deformable portion 23 is less than that of second elastically deformable portion 31 which is less than that of the joining portion 12. The joining portion 12 may be substantially a rigid body, or the rigidity may be set to a bending rigidity close to that of a rigid body.

A tip of the second elastic member 30 is provided with gimbals 40. The gimbals 40 is formed of a leaf spring material, and its bending rigidity is set to be substantially lower than the bending rigidity of the first elastically deformable portion 23 and the bending rigidity of the second elastically deformable portion 31. The gimbals 40 have an outer frame fixing portion 41 and a central supporting portion 42. The outer frame fixing portion 41 and the central supporting portion 42 are separated from each other with a notch 44 therebetween. In a trailing connecting piece 43, the outer frame fixing portion 41 and the central supporting portion 42 are formed continuously and integrally with each other.

As shown in FIGS. 1 and 2, the outer frame fixing portion 41 is fixed to the tip of the second elastic member 30 by a spot-welded portion 33. Further, a back surface of a slider 51 of a head element 50 is fixedly adhered to a lower surface of the central supporting portion 42. The tip of the second elastic member 30 is formed integrally with a downwardly protruding pivot 34. The pivot 34 abuts against the central supporting portion 42. A supporting point of the pivot 34 and the central supporting point 42 functions as a supporting point that supports the head element 50. As shown in FIG. 1, both the intermediate pivot 25 and the pivot 34 are located on the longitudinal centerline Ox.

The slider 51 provided in the head element 50 may be formed of a ceramic material. The slider 51 has its back surface fixedly adhered to the central supporting portion 42 of the gimbals 40 and an opposite surface 54 opposed to a recording surface of a magnetic recording medium, such as a hard disk. The opposite surface 54 is formed with a concavo-convex portion to control a floating distance from the recording surface. A surface of the slider 51 facing the mounting portion 21 is a leading end surface 52, and a surface of the slider opposite to this surface is a trailing end surface 53. The trailing end surface 53 is provided with a magnetic reproducing unit and a magnetic recording unit that may be formed of a metallic thin film.

The head element supporting apparatus 10 is installed such that the opposite surface 54 of the slider 51 faces a recording surface of a magnetic recording medium, such as a hard disk. In this state, a load pressure F is set by the first elastically deformable portion 23 of the first elastic member 20 and the second elastically deformable portion 31 of the second elastic member 30. This load pressure F causes the opposite surface 54 of the slider 51 to be pressed against the surface of the magnetic recording medium.

When a magnetic recording medium rotates, airflow above the recording surface gives the opposite surface 54 of the slider 51 a floating force. By balancing between the floating force and the load pressure F, the slider 51 faces the surface of the magnetic recording medium at a floating distance therefrom, or slides on the surface of the magnetic recording medium with a minimal frictional force. In the head element supporting apparatus 10, both the first elastically deformable portion 23 and the second elastically deformable portion 31 are elastically deformable. Therefore, the balance between the floating force and the load pressure F, which act on the slider 51, may be maintained, and consequently, variation in the floating distance of the slider 51 may be reduced.

In other words, the floating force acting on the slider 51 acts not only on the first elastically deformable portion 23, but also on the second elastically deformable portion 31. Further, bendably deformable regions of the first elastically deformable portion 23 and the second elastically deformable portion 31 are arranged on a long area along the longitudinal centerline Ox. Therefore, the floating force acting on the slider 51 is kept well-balanced by an elastic force of the first elastically deformable portion 23 and an elastic force of the second elastically deformable portion 31. It thus may be possible to restrain the slider 51 from springing up from the surface of the magnetic recording medium.

Moreover, since the bending rigidity of the second elastically deformable portion 31 may be higher than the bending rigidity of the first elastically deformable portion 23, it may be possible to restrain the second elastically deformable portion 31 from being improperly deformed due to the floating force or extraneous vibration acting on the slider 51.

While the magnetic recording medium rotates, the surface of the magnetic recording medium fluctuates up and down or fluctuates in a slanting direction. However, the head element 50 follows up the fluctuation as it swings about the pivot 34 as a fulcrum. Moreover, the second elastically deformable portion 31 can be slightly inclined about the intermediate supporting point that is an abutting point between itself and the intermediate pivot 25. This movement facilitates inclination of the head element 50 in a rolling direction about the longitudinal centerline Ox and in a pitching direction about a transverse centerline Oy.

Hence, the opposite face 54 of the slider 51 flexibly and easily follows up changes in shape of the surface of the magnetic recording medium, and thereby the distance between the magnetic reproducing unit or the magnetic recording unit, which is provided on the trailing end surface 53, and the recording surface of the magnetic recording medium may be kept constant.

Moreover, since the joining portion 12 between the first elastic member 20 and the second elastic member 30 functions essentially as a rigid body, torsion or the like acting on the second elastic member 31 is easily transmitted to the first elastic member 20. This may also suppress unintended vibration of the slider 51.

In another aspect rigid portions may be formed in portions of the first elastic member 20 and the second elastic member 30 by bending both side edges of an elastic plate.

Although the present invention has been explained by way of the examples described above, it should be understood to the ordinary skilled person in the art that the invention is not limited to the examples, but rather that various changes or modifications thereof are possible without departing from the spirit of the invention. Accordingly, the scope of the invention shall be determined only by the appended claims and their equivalents.

The invention claimed is:

1. A head element support apparatus provided with a load beam, the load beam having a head element provided with at least one of a magnetic recording unit or a magnetic reproducing unit, gimbals having the head element fixed thereto, and a supporting point for the head element fixed to the gimbals, wherein the load beam is configured such that a first elastic member having a mounting portion for fixation at a base thereof and a second elastic member having the supporting point at a tip thereof are connected to each other, each of the first elastic member and the second elastic member has an elastically deformable portion, and a first bending rigidity of the elastically deformable portion of the first elastic member is lower than a second bending rigidity of the elastically deformable portion of the second elastic member, wherein an intermediate supporting point that supports the second elastic member is provided between the first elastic member and the second elastic member, and wherein the intermediate supporting point is located on a centerline that divides the load beam into two in its widthwise direction.

2. The head element support apparatus according to claim 1, wherein the supporting point is located on a centerline that divides the load beam into two in its widthwise direction.

3. The head element support apparatus according to claim 1, wherein a bending rigidity of a joining portion between the first elastic member and the second elastic member is higher than the first and second bending rigidities.

4. The head element support apparatus according to claim 3, wherein the first elastic member and the second elastic member are connected by spot welding or by an adhesive to form the joining portion.

5. The head element support apparatus according to claim 1, wherein at least one of the first or the second elastic members has portions of a side edge thereof bent at an angle with respect to a plane of the respective elastic member.

6. The head element support apparatus according to claim 1, where the bending rigidity of at least one of the first or the second elastic members is determined by the size and configuration of an aperture therein, the aperture being located on a centerline that divides the load beam into two in its widthwise direction.

* * * * *